(12) United States Patent
Zhong

(10) Patent No.: US 11,209,155 B1
(45) Date of Patent: Dec. 28, 2021

(54) AIR PLUG

(71) Applicant: SHANGRAO ACTEARLIER CO., LTD., Shangrao (CN)

(72) Inventor: Yunnan Zhong, Shangrao (CN)

(73) Assignee: SHANGRAO ACTEARLIER CO., LTD., Shangrao (CN)

( * ) Notice: Subject to any disclaimer, the term of this patent is extended or adjusted under 35 U.S.C. 154(b) by 0 days.

(21) Appl. No.: 17/022,144

(22) Filed: Sep. 16, 2020

(30) Foreign Application Priority Data

Aug. 13, 2020 (CN) .......................... 202021689135.0

(51) Int. Cl.
| | | |
|---|---|---|
| *F21V 33/00* | (2006.01) | |
| *F16L 55/115* | (2006.01) | |
| *F21V 19/00* | (2006.01) | |
| *F21S 9/02* | (2006.01) | |
| *F21V 23/04* | (2006.01) | |
| *F21Y 115/10* | (2016.01) | |

(52) U.S. Cl.
CPC ......... *F21V 33/008* (2013.01); *F16L 55/1152* (2013.01); *F21S 9/02* (2013.01); *F21V 19/0045* (2013.01); *F21V 23/04* (2013.01); *F21Y 2115/10* (2016.08)

(58) Field of Classification Search
CPC .... F21V 33/008; F21V 19/0045; F21V 23/04; F16L 55/1152; F21S 9/02
See application file for complete search history.

(56) References Cited

U.S. PATENT DOCUMENTS

| | | | | | |
|---|---|---|---|---|---|
| 5,456,032 | A | * | 10/1995 | Matsumoto | .......... A43B 3/0005 200/61.48 |
| 5,465,197 | A | * | 11/1995 | Chien | .................. A43B 1/0036 362/202 |
| 5,725,445 | A | * | 3/1998 | Kennedy | ................ A63B 43/06 473/570 |
| 5,746,500 | A | * | 5/1998 | Chien | .................. A43B 1/0036 36/137 |

* cited by examiner

*Primary Examiner* — Thomas M Sember

(57) ABSTRACT

An air plug is provided, including a switch, a circuit board, an elastic connecting wire and an enclosure. At least one LED bead is provided on the circuit board and electrically coupled to the circuit board. The elastic connecting wire has one end fixed to the circuit board and an other end fixed to the switch. The switch is electrically coupled to the circuit board. The circuit board is received within the enclosure and fixed to the enclosure. The elastic connecting wire and the switch are movably received within the enclosure. The air plug is insertable into an air inlet of an inflatable item, the inflatable item vibrates to activate the switch, and thus the LED bead is powered on to illuminate the inflatable item, such that the interest of the inflatable item is increased.

17 Claims, 3 Drawing Sheets

AIR PLUG

CROSS REFERENCE TO RELATED APPLICATIONS

The present disclosure claims priority to Chinese Patent Application No. 202021689135.0 filed Aug. 13, 2020, which is hereby incorporated by reference herein as if set forth in its entirety.

TECHNICAL FIELD

The present disclosure relates to a field of toy, especially to an air plug.

BACKGROUND

Air plugs are used to block the air inlets of inflatable items, such as inflatable balls and inflatable toys. The air plugs block the air inlets to prevent the gas inside the inflatable items from venting through the air inlets. However, the current air plugs merely have a single function of blocking the air inlets, lacking of interest.

SUMMARY

The present disclosure provides an air plug for solving the aforementioned problem.

The present disclosure is realized by the following technical solutions.

An air plug is provided according to an embodiment of the present disclosure, including a switch, a circuit board, an elastic connecting wire and anenclosure. At least one LED bead is provided on the circuit board and electrically coupled to the circuit board. The elastic connecting wire has one end fixed to the circuit board and an other end fixed to the switch. The switch is electrically coupled to the circuit board. The circuit board is received within the enclosure and fixed to the enclosure. The elastic connecting wire and the switch are movably received within the enclosure.

In some embodiments, the enclosure includes a first housing and a second housing partly received within the first housing and threaded to the first housing.

In some embodiments, the first housing defines a first receiving groove within which the circuit board is received and fixed to the first housing. The elastic connecting wire and the switch are movably received within the first receiving groove.

In some embodiments, the first housing is provided with an annular protrusion received within the first receiving groove and fixed to the first housing. The circuit board is fixed to the annular protrusion and covers the switch.

In some embodiments, the air plug further includes a battery. The second housing defines a second receiving groove matching with a profile of the battery. The second receiving groove communicates with the first receiving groove. The battery is received within the second receiving groove and electrically coupled to the circuit board.

In some embodiments, a cover board is provided at a top of the second housing and covers the second housing.

In some embodiments, a crossed-shaped recess is provided on the cover board.

In some embodiments, a lower portion of the first housing is constricted to form a leading portion. A smooth transition is provided between the leading portion and the first housing.

In some embodiments, both the first housing and the second housing are made from transparent materials.

In some embodiments, the first receiving groove is provided with internal thread on an inner surface thereof. The second housing is provided with external thread on an outer surface thereof. The internal thread matches the inner surface to form a threaded connection between the first housing and the second housing.

The invention has advantages as follows. The air plug provided by the present disclosure includes a switch and a LED bead. The air plug is insertable into an air inlet of an inflatable item, the inflatable item vibrates to activate the switch, and thus the LED bead is powered on to illuminate the inflatable item, such that the interest of the inflatable item is increased.

DETAILED DESCRIPTION

The present disclosure will be further described below with reference to the accompanying drawings for more clearly and fully discussing the technical solutions of the present disclosure.

Figure 1:
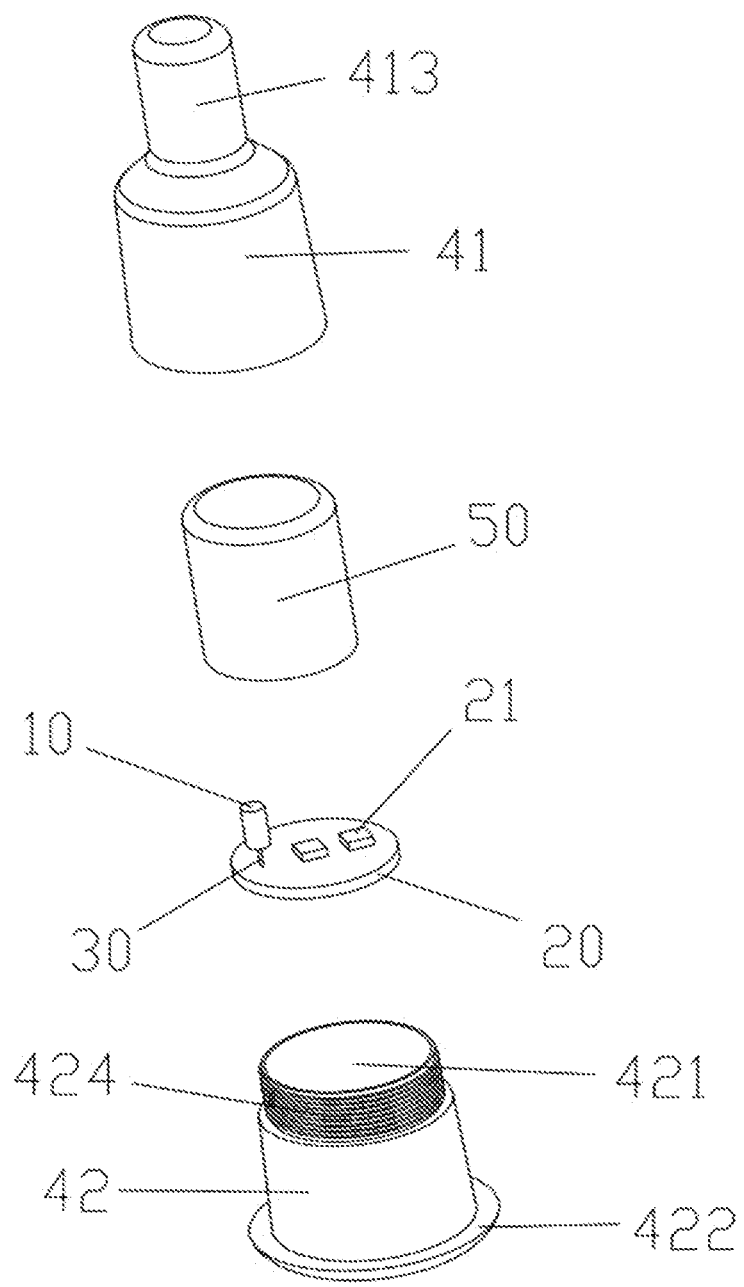
FIG. 1 shows an exploded view of an air plug according to the present disclosure.
Figure 2:
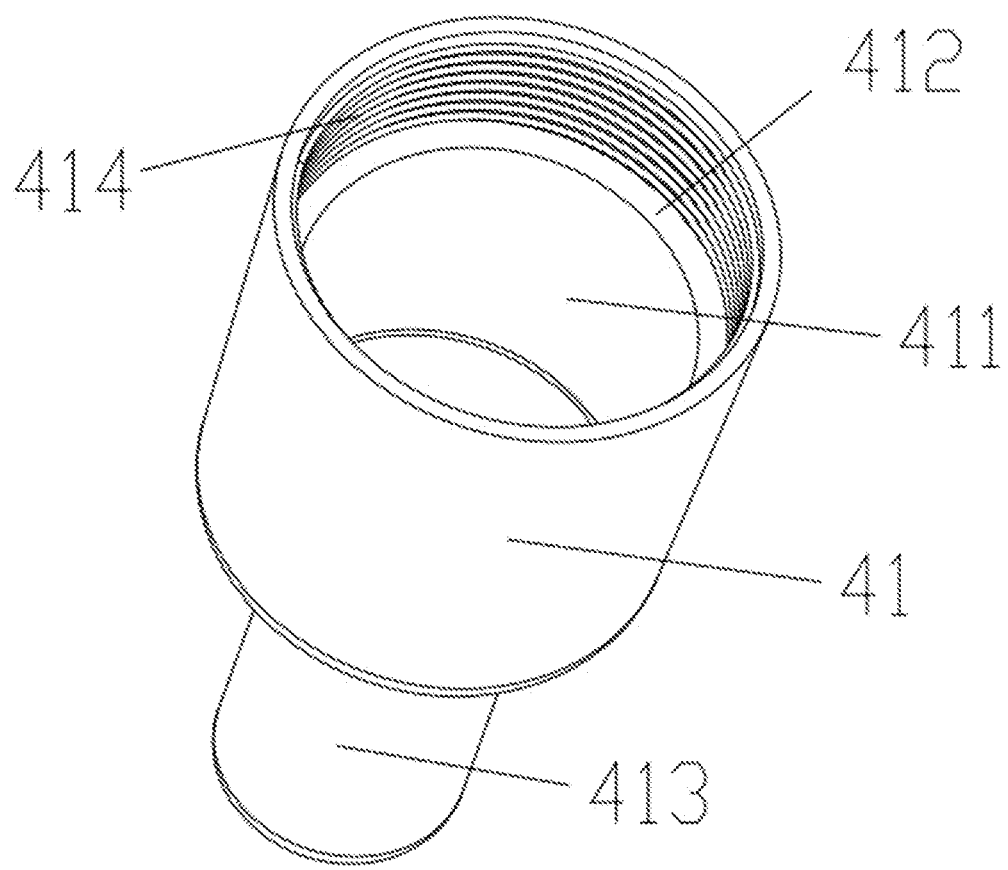
FIG. 2 shows a perspective view of a first housing of the air plug according to the present disclosure.
Figure 3:
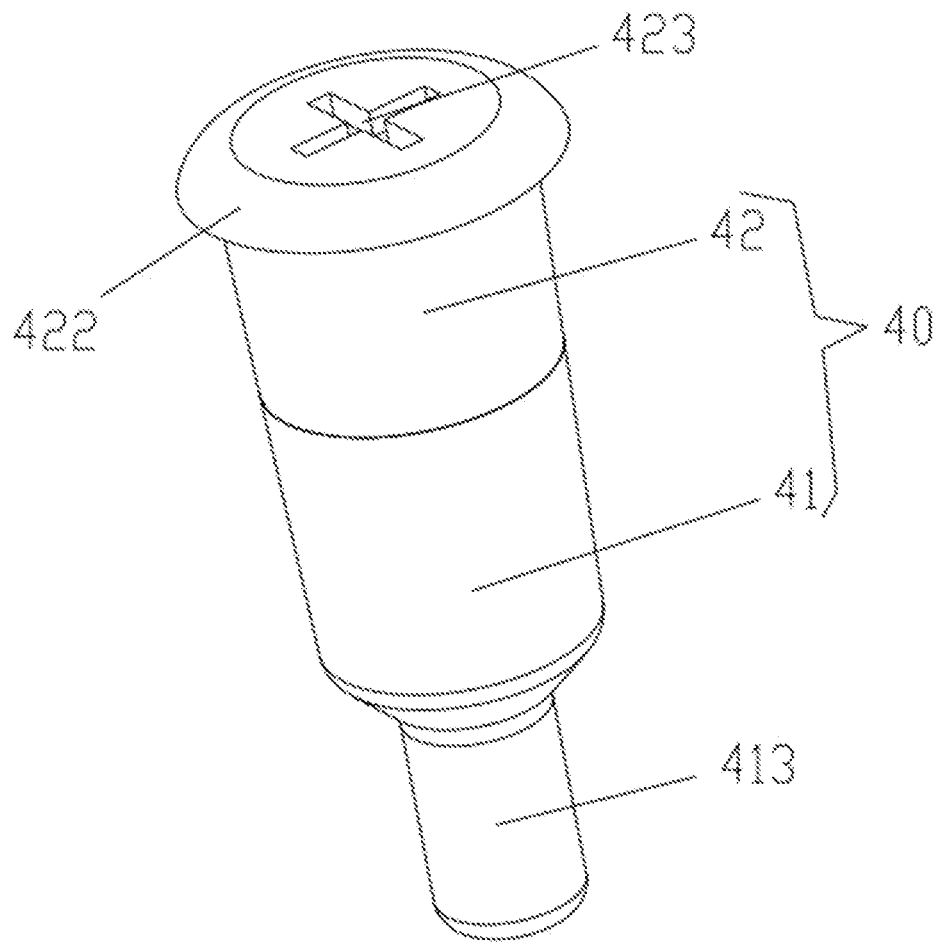
FIG. 3 shows a perspective view of the air plug according to the present disclosure.

An air plug is provided according to an embodiment of the present disclosure, as shown in FIGS. 1 to 3. The air plug includes a switch 10, a circuit board 20, an elastic connecting wire 30 and an enclosure 40. At least one LED bead 21 is provided on the circuit board 20 and electrically coupled to the circuit board 20. The elastic connecting wire 30 has one end fixed to the circuit board 20 and an other end fixed to the switch 10. The switch 10 is electrically coupled to the circuit board 20. The circuit board 20 is received within the enclosure 40 and fixed to the enclosure 40. The elastic connecting wire 30 and the switch 10 are movably received within the enclosure 40.

In this embodiment, two LED beads 21 are provided and emit synchronously or emit alternately at intervals. The switch 10 may be a vibration switch. The elastic connecting wire 30 may be a metal wire. Since the elastic connecting wire 30 and the switch 10 are movably received within the enclosure 40, the elastic connecting wire 30 and thus the switch 10 can oscillate within the enclosure 40. After the air plug blocks an air inlet of an inflatable item, with the vibration of the inflatable item, the switch 10 vibrates to be activated, and thus the LED bead 21 is powered on to illuminate the inflatable item, such that the interest of the inflatable item is increased.

In some embodiments, the enclosure 40 includes a first housing 41 and a second housing 42 partly received within the first housing 41 and threaded to the first housing 41. The first housing 41 defines a first receiving groove 411 within which the circuit board 20 is received and fixed to the first housing 41. The elastic connecting wire 30 and the switch 10 are movably received within the first receiving groove 411.

Since the elastic connecting wire 30 and the switch 10 are movably received within the first receiving groove 411, the elastic connecting wire 30 and thus the switch 10 can oscillate within the first receiving groove 411.

In some embodiments, the first housing 41 is provided with an annular protrusion 412 received within the first receiving groove 411 and fixed to the first housing 41. The circuit board 20 is fixed to the annular protrusion 412 and covers the switch 10.

The circuit board 20 abuts against the annular protrusion 412 and fixed to the the annular protrusion 412.

In some embodiments, the air plug further includes a battery 50. The second housing 42 defines a second receiving groove 421 that matches with the profile of the battery 50. The second receiving groove 421 communicates with the first receiving groove 411. The battery 50 is received within the second receiving groove 421 and electrically coupled to the circuit board 20.

The battery 50 is received within the second receiving groove 421 and electrically coupled to the circuit board 20, so as to provide power to the LED lamp bead 21. After the second housing 42 is screwed to the first housing 41, the battery has one end abutting against the inner wall of the second receiving groove 421 and the other end abutting against the circuit board 20, such that the battery 50 is firmly received within the second receiving groove 421.

In some embodiments, a cover board 422 is provided at a top of the second housing 42 and covers the second housing 42.

The cover board 422 has a diameter larger than that of the second housing 42.

In some embodiments, a crossed-shaped recess 423 is provided on the cover board 422.

A screwdriver may be employed to cooperate with the crossed-shaped recess 423 to screw the second housing 42 out of the first housing 41.

In some embodiments, a lower portion of the first housing 41 is constricted to form a leading portion 413. A smooth transition is provided between the leading portion 413 and the first housing 41.

The lower portion of the first housing 41 is constricted to form the leading portion 413 which facilitates insertion of the air plug into the air inlet of the inflatable item.

In some embodiments, both the first housing 41 and the second housing 42 are made from transparent materials.

Light emitted from the LED bead may travel through the first housing 41 and the second housing 42.

In some embodiments, the first receiving groove 411 is provided with internal thread 414 on an inner surface thereof. The second housing is provided with external thread 424 on an outer surface thereof. The internal thread 414 matches the inner surface 424 to form a threaded connection between the first housing 41 and the second housing 42.

The first housing 41 is mounted to the second housing 42 by screwing, with the second housing 42 partly received within the first receiving groove 411.

It should be noted that the present disclosure may have other various embodiments. Modifications and variations made by those skilled in the art based on the embodiments according to the present application without any creative work also fall within the scope of the present disclosure.

What is claimed is:

1. An air plug, comprising a switch, a circuit board, an elastic connecting wire and an enclosure, at least one LED bead being provided on the circuit board and electrically coupled to the circuit board, the elastic connecting wire having one end fixed to the circuit board and an other end fixed to the switch, the switch being electrically coupled to the circuit board, the circuit board being received within the enclosure and fixed to the enclosure, the elastic connecting wire and the switch being movably received within the enclosure, the enclosure comprising a first housing and a second housing partly received within the first housing and threaded to the first housing, a cover board being provided at a top of the second housing and covers the second housing, and a crossed-shaped recess being provided on the cover board.

2. The air plug according to claim 1, wherein the first housing defines a first receiving groove within which the circuit board is received and fixed to the first housing, and the elastic connecting wire and the switch are movably received within the first receiving groove.

3. The air plug according to claim 1, wherein the first housing is provided with an annular protrusion received within the first receiving groove and fixed to the first housing, and the circuit board is fixed to the annular protrusion and covers the switch.

4. The air plug according to claim 2, further comprising a battery, the second housing defines a second receiving groove matching with a profile of the battery, the second receiving groove communicates with the first receiving groove, and the battery is received within the second receiving groove and electrically coupled to the circuit board.

5. The air plug according to claim 1, wherein a lower portion of the first housing is constricted to form a leading portion, and a smooth transition is provided between the leading portion and the first housing.

6. The air plug according to claim 1, wherein both the first housing and the second housing are made from transparent materials.

7. The air plug according to claim 2, wherein the first receiving groove is provided with internal thread on an inner surface thereof, the second housing is provided with external thread on an outer surface thereof, and the internal thread matches the inner surface to form a threaded connection between the first housing and the second housing.

8. An air plug, comprising a switch, a circuit board, an elastic connecting wire and an enclosure, at least one LED bead being provided on the circuit board and electrically coupled to the circuit board, the elastic connecting wire having one end fixed to the circuit board and an other end fixed to the switch, the switch being electrically coupled to the circuit board, the circuit board being received within the enclosure and fixed to the enclosure, the elastic connecting wire and the switch being movably received within the enclosure, the enclosure comprising a first housing and a second housing partly received within the first housing, a cover board being provided at a top of the second housing and covering the second housing, the cover board protruding in a direction perpendicular to a longitudinal axis of the air plug beyond a peripheral surface of the second housing.

9. The air plug according to claim 8, wherein the second housing is threaded to the first housing.

10. The air plug according to claim 9, wherein the first housing defines a first receiving groove within which the circuit board is received and fixed to the first housing, and the elastic connecting wire and the switch are movably received within the first receiving groove.

11. The air plug according to claim 9, wherein the first housing is provided with an annular protrusion received within the first receiving groove and fixed to the first housing, and the circuit board is fixed to the annular protrusion and covers the switch.

12. The air plug according to claim 10, further comprising a battery, the second housing defines a second receiving groove matching with a profile of the battery, the second receiving groove communicates with the first receiving groove, and the battery is received within the second receiving groove and electrically coupled to the circuit board.

13. The air plug according to claim 8, wherein a crossed-shaped recess is provided on the cover board.

14. The air plug according to claim 9, wherein a lower portion of the first housing is constricted to form a leading portion, and a smooth transition is provided between the leading portion and the first housing.

15. The air plug according to claim 9, wherein both the first housing and the second housing are made from transparent materials.

16. The air plug according to claim 10, wherein the first receiving groove is provided with internal thread on an inner surface thereof, the second housing is provided with external thread on an outer surface thereof, and the internal thread matches the inner surface to form a threaded connection between the first housing and the second housing.

17. An air plug, comprising a switch, a circuit board, an elastic connecting wire and an enclosure, at least one LED bead being provided on the circuit board and electrically coupled to the circuit board, the elastic connecting wire having one end fixed to the circuit board and an other end fixed to the switch, the switch being electrically coupled to the circuit board, the circuit board being received within the enclosure and fixed to the enclosure, the elastic connecting wire and the switch being movably received within the enclosure, the enclosure comprising a first housing and a second housing partly received within the first housing, a cover board being provided at a top of the second housing and covering the second housing, the cover board having a diameter larger than that of the second housing.

* * * * *